United States Patent

Oura

Patent Number: 4,715,752
Date of Patent: Dec. 29, 1987

[54] CUTTER HEAD IN A MACHINE TOOL

[75] Inventor: Masayuki Oura, Kyoto, Japan

[73] Assignee: Mitsubishi Jukogyo Kabushiki Kaisha, Tokyo, Japan

[21] Appl. No.: 15,345

[22] Filed: Feb. 17, 1987

[30] Foreign Application Priority Data

Mar. 11, 1986 [JP] Japan ............... 61-33868[U]

[51] Int. Cl.⁴ .............................................. B23Q 5/04
[52] U.S. Cl. .................................. 409/232; 409/234
[58] Field of Search ............... 409/231, 232, 234, 204, 409/230; 279/1 G, 2 R; 29/568

[56] References Cited

U.S. PATENT DOCUMENTS

| | | | |
|---|---|---|---|
| 1,797,296 | 3/1931 | Ray | 409/234 |
| 1,985,434 | 12/1934 | Vancil et al. | 409/231 |
| 4,137,822 | 2/1979 | Behnke | 409/234 |
| 4,536,110 | 8/1985 | Farrell et al. | 409/234 |

FOREIGN PATENT DOCUMENTS

| | | | |
|---|---|---|---|
| 112724 | 8/1980 | Japan | 409/234 |
| 146622 | 8/1985 | Japan | 409/230 |

*Primary Examiner*—Z. R. Bilinsky
*Assistant Examiner*—Daniel W. Howell
*Attorney, Agent, or Firm*—Wenderoth, Lind & Ponack

[57] ABSTRACT

An improved cutter head in a machine tool includes a cutter head main body, a cutter spindle that is rotatably supported by the cutter head main body and adapted to be rotatably driven, a cutter support carried by the cutter head main body so as to be rotatable and movable along the axial direction of the cutter spindle, and a support shaft that is rotatably supported by the cutter support so as to be coaxial with the cutter spindle. At the tip end of the support shaft is formed a collet section having an expansible and contractible diameter so that the tip end of the cutter spindle can be fitted in the inner circumference of the collet section, resulting in expansion of the diameter of the collet section, and a cutter can be fitted around the outer circumference of the collet section. The improved cutter head further includes a clamp device for clamping the cutter fitted around the outer circumference of the collet section by bringing the cutter spindle and the support shaft close to each other under the state where the tip end of the cutter spindle is fitted in the collet section of the support shaft.

1 Claim, 6 Drawing Figures

4,715,752

CUTTER HEAD IN A MACHINE TOOL

BACKGROUND OF THE INVENTION

The present invention relates to a cutter head in a machine tool that can be favorably applied to a shaving machine in order to facilitate a cutter replacement operation.

One example of the heretofore known cutter heads in a shaving machine is schematically illustrated in cross-section in FIG. 6. In this figure, a cutter head main body 101 is mounted to a head carrier 102 so as to be rotatable by about ±20 degrees within a horizontal plane about a vertical axis so that a cutter can be engaged with a workpiece, and a cutter spindle 103 is rotatably supported by the cutter head 101 via bearings 104, 105 and 106. To this cutter spindle 103 is fixedly secured a drive gear 107, and the cutter spindle 103 is rotatably driven by a main shaft motor, not shown, by the intermediary of this drive gear 107. A shaving cutter 108 is fitted around a tip end portion of this cutter spindle 103, sandwiched between cutter collars 109, and fixedly mounted by fastening a nut 110. On the other hand, in the proximity of the tip end of the cutter spindle 103, a cutter support 111 is detachably fixed to the cutter head main body 101 by means of bolts (not shown), and the tip end of the cutter spindle 103 is supported by being fitted in a bore 115 drilled in a support shaft 114 that is rotatably supported within the cutter support 111 via bearings 112 and 113.

In such a heretofore known cutter head, upon mounting or dismounting a shaving cutter 108, each time the cutter support 111 is dismounted by loosening the bolts, the nut 110 is removed, and thereafter the shaving cutter 108 is fitted around or extracted from the cutter spindle 103.

The above-described prior art cutter head involves the following problems:

(1) Upon replacement of a cutter, since the cutter support 111 must be dismounted each time, the cutter replacement operation becomes complex.

(2) Since the cutter spindle 103 extends nearly in the left and right directions as viewed by an operator under the condition where the operator faces the shaving machine, the operator must fit or extract the shaving cutter 108 to or from the cutter spindle 103 in the lateral direction, and such operation is awkward. In other words, this cutter replacement operation forces the operator to take an unnatural attitude, and may possibly cause an injury such as a back injury of the operator.

(3) Since the gap clearance at the fitting portion between the cutter spindle 103 and the shaving cutter 108 is as small as several microns because of the demand for precision in a shaving operation, in association with the above-mentioned awkwardness, the operation of fitting or extracting the shaving cutter 108 to or from the cutter spindle 103 requires a high level of skill.

(4) As the cutter replacement operation is complex and needs a high degree of technique, it is impossible to automate the cutter replacement operation.

SUMMARY OF THE INVENTION

It is therefore one object of the present invention to resolve the above-mentioned problems of the known cutter heads in the shaving machines in the prior art.

A more specific object of the present invention is to provide a cutter head in a machine tool in which a cutter replacement operation is facilitated.

According to one feature of the present invention, there is provided a cutter head in a machine tool comprising a cutter head main body, a cutter spindle that is rotatably supported by the cutter head main body and adapted to be rotatably driven, a cutter support carried by said cutter head main body so as to be rotatable and movable along the axial direction of the cutter spindle, a support shaft that is rotatably supported by the cutter support so as to be coaxial with the cutter spindle, a collet section having an expansible and contractible diameter so that the tip end of the cutter spindle can be fitted in its inner circumference resulting in expansion of the diameter of the collet section and a cutter can be fitted around its outer circumference, being formed at the tip end of the support shaft, and clamp means for clamping the cutter fitted around the outer circumference of the collet section by bringing the cutter spindle and the support shaft close to each other under the state where the tip end of the cutter spindle is fitted in the collet section of the support shaft.

In the cutter head according to the present invention, owing to the above-described structural feature, under the condition where a cutter is fitted around the cutter circumference of the collet section of the support shaft and the collet section has been expanded in diameter and centered by fitting the tip end of the cutter spindle into the collet section, the cutter is clamped by being pinched under pressure between the cutter spindle and the support shaft by the action of the clamp means. On the other hand, when the clamp means is released and simultaneously the cutter support is separated from the cutter spindle along the axial direction of the cutter spindle, the cutter separates from the cutter spindle while it is kept fitted around the collet section of the support shaft. When the cutter spindle is extracted from the collet section, the collet section contracts in diameter, so that the gap clearance between the collet section and the cutter at the fitted portion increases and hence mounting and dismounting of the cutter become easy. Thereafter the cutter support is rotated to direct the support shaft in a desired direction, and then mounting or dismounting of a cutter to or from the support shaft is effected.

The above-mentioned and other objects, features and advantages of the present invention will become more apparent by reference to the following description of one preferred embodiment of the invention taken in conjunction with the accompanying drawings.

DESCRIPTION OF THE PREFERRED EMBODIMENT

In the following, one preferred embodiment of the present invention as applied to a cutter head in a shaving machine will be described in greater detail with reference to the accompanying drawings.

Figure 1:
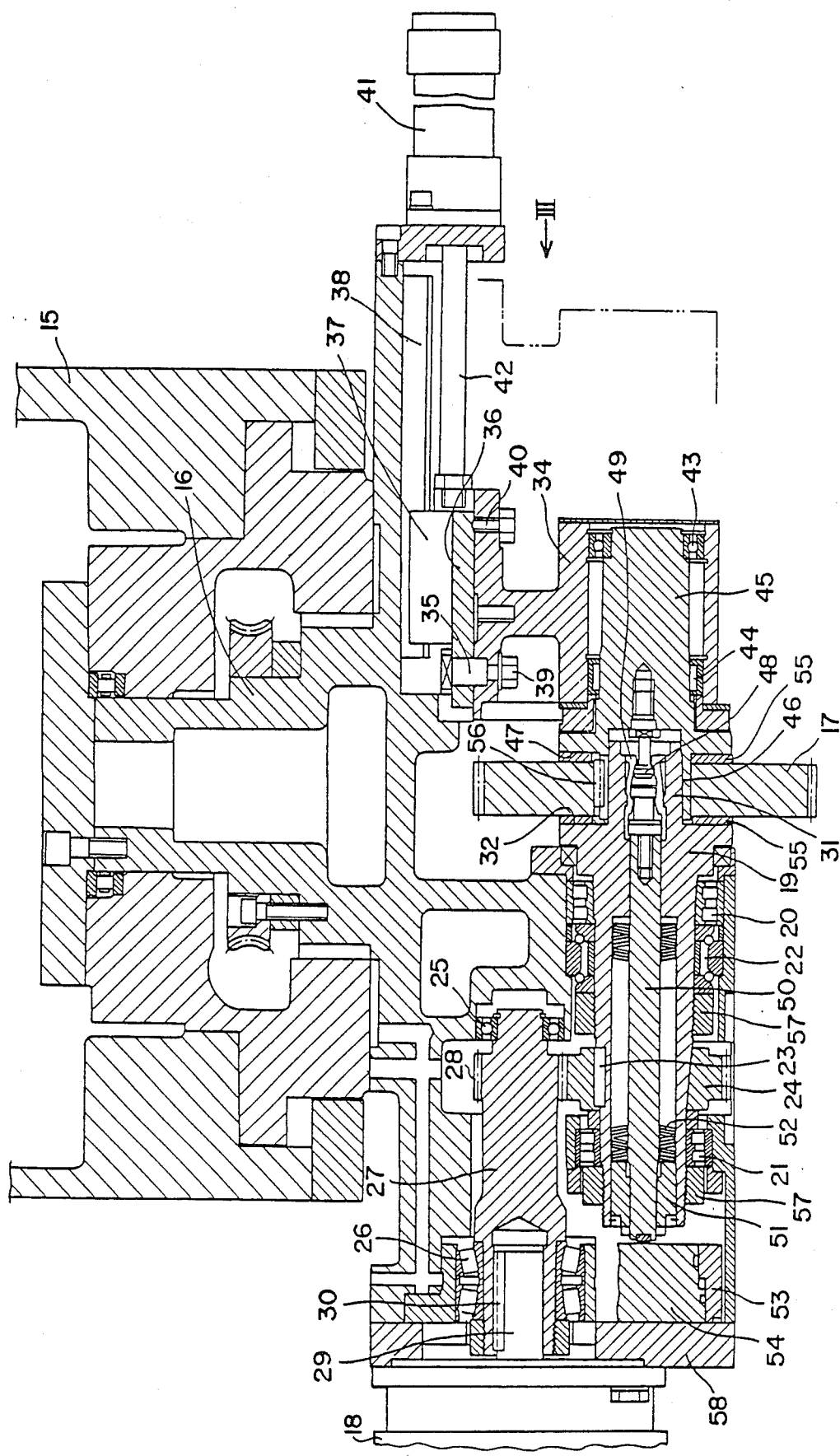
FIG. 1 is a cross-sectional view of a cutter head in a shaving machine according to one preferred embodiment of the present invention.
Figure 2:
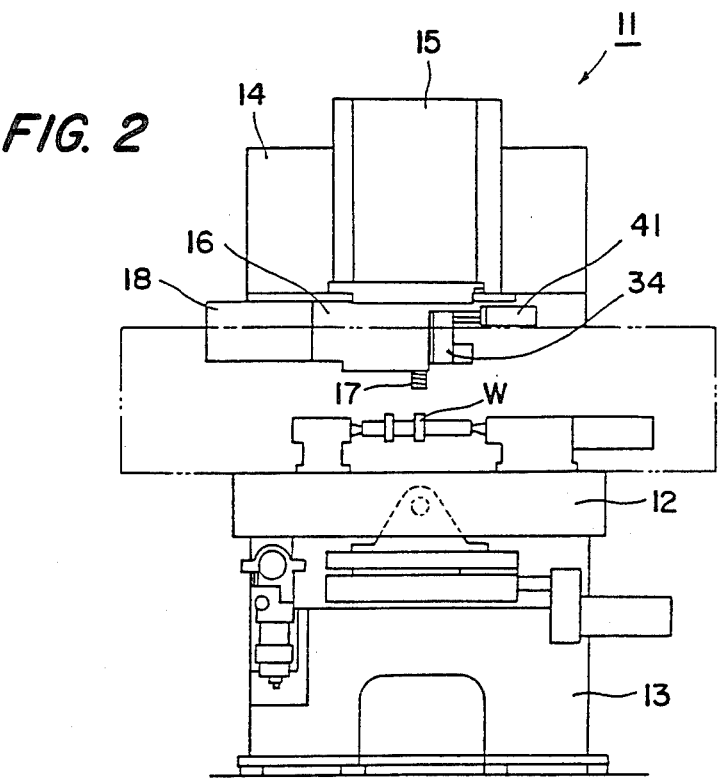
FIG. 2 is a schematic front view of the entire shaving machine.

As shown in FIG. 2, in a shaving machine 11, a workpiece W is supported on a table 12, while a head carrier 15 is mounted slidably in the vertical direction on a column 14 erected on a bed 13, and at the bottom end of the head carrier 15 is mounted a cutter head main body 16 so as to be rotatable by about ±20 degrees about a vertical axis. In this cutter head main body 16 is provided a cutter spindle (not shown in FIG. 2). A shaving cutter 17 mounted to the cutter spindle is engaged with the workpiece W by adjusting a rotational angle of the cutter head main body 16, and shaving of the workpiece W is effected by engaging rotation between the shaving cutter 17 and the workpiece W caused by rotating the cutter spindle as a result of actuation of a main shaft motor 18 (FIG. 1).

As shown in FIG. 1, a cutter spindle 19 is rotatably supported by the cutter head main body 16 via radial bearings 20 and 21 and a thrust bearing 22. To the cutter spindle 19 is mounted a drive gear 24 that is keyed by means of a key 23, and on the other hand, a gear 28, formed on a gear shaft 27 that is rotatably supported by the cutter head main body 16 via bearings 25 and 26 in parallel to the cutter spindle 19, is meshed with this drive gear 24. At a base end portion of the gear shaft 27, a rotary shaft 29 of main shaft motor 18 fixedly secured to the cutter head main body 16 is inserted into the gear shaft 27 and they are keyed with each other by means of a key 30. Accordingly, but actuating the main shaft motor 18, the cutter spindle 19 is rotatably driven by the intermediary of the gear shaft 27, gear 28 and the drive gear 24. At the tip end of the cutter spindle 19 is provided an insert section 31 that can be inserted into a collet section 46 of a support shaft 45 as will be described later, and contiguously to insert section 31, a pressing surface 32 for pinching the shaving cutter 17 under pressure is formed on the side of the base end of the cutter spindle 19. In addition, at some parts of the circumferential surface of the tip end of the cutter spindle 19 are formed flat surfaces 33 (See FIG. 4.), so that when this tip end portion is inserted into the support shaft 45, it fits into a rectangular bore of the support shaft, and thereby relative rotation between the cutter spindle 19 and the support shaft 45 can be prevented.

Figure 3:
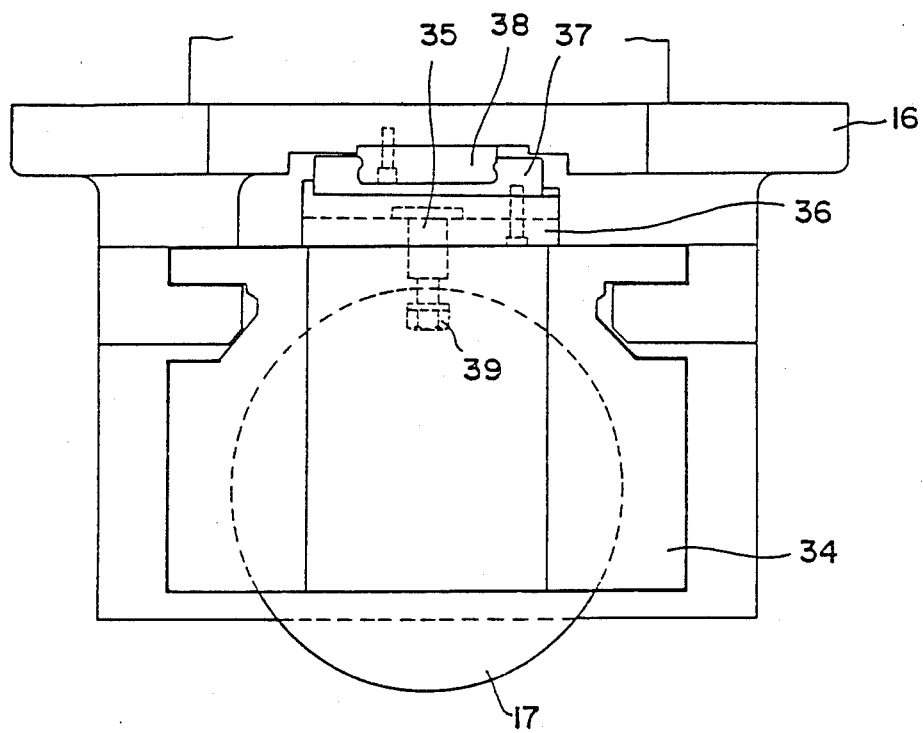
FIG. 3 is a schematic side view of the same as viewed in the direction of an arrow III in FIG. 1.
Figure 5:
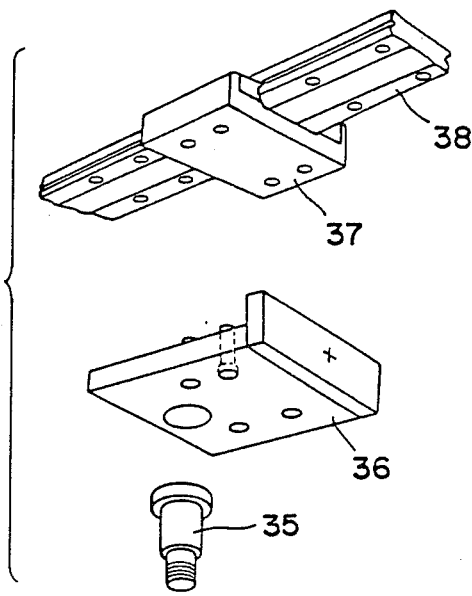
FIG. 5 is a perspective view of a slider portion in the same cutter head.
Figure 6:
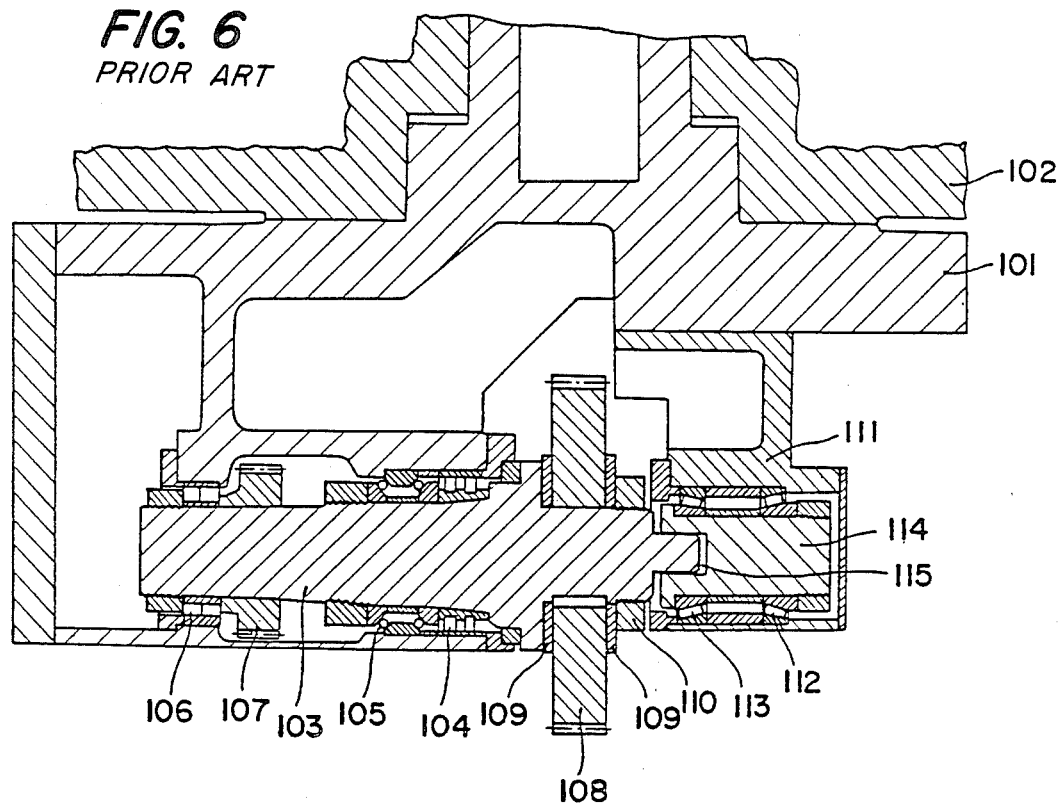
FIG. 6 is a schematic cross-sectional view of a heretofore known cutter head in a shaving machine.

On the other hand, in front of the cutter spindle 19 is disposed a cutter support 34 for supporting the tip end of the cutter spindle 19. The cutter support 34 is supported from a bracket 36 by a pivot bolt 35 so as to be rotatable within a horizontal plane about a vertical axis at the center of the pivot bolt 35. Bracket 36 is fixedly screwed to a slider 37, and further, the slider 37 is slidably supported from a rail 38 that is mounted to the cutter head main body 16 in parallel to the axial direction of the cutter spindle 19 (See FIGS. 3 and 5.). In other words, the cutter support 34 is supported from the cutter head main body 16 so as to be rotatable and movable along the axial direction of the cutter spindle 19. This cutter support 34 is made to be rotatable with respect to the bracket 36 by loosening a nut 39 threadedly engaged with the pivot bolt 35 and positioning and fixing bolts 40, while it is made to be integral with the bracket 36 by fastening these nut and bolts. In addition, to the cutter head main body 16 is mounted a cylinder 41 for driving the slider 37. A rod 42 of the cylinder 41 extending parallel to the rail 38 is connected with the slider 37, and so, in response to actuation of the cylinder 41, the slider 37 is driven along the rail 38 jointly with the bracket 36 and the cutter support 34.

Figure 4:
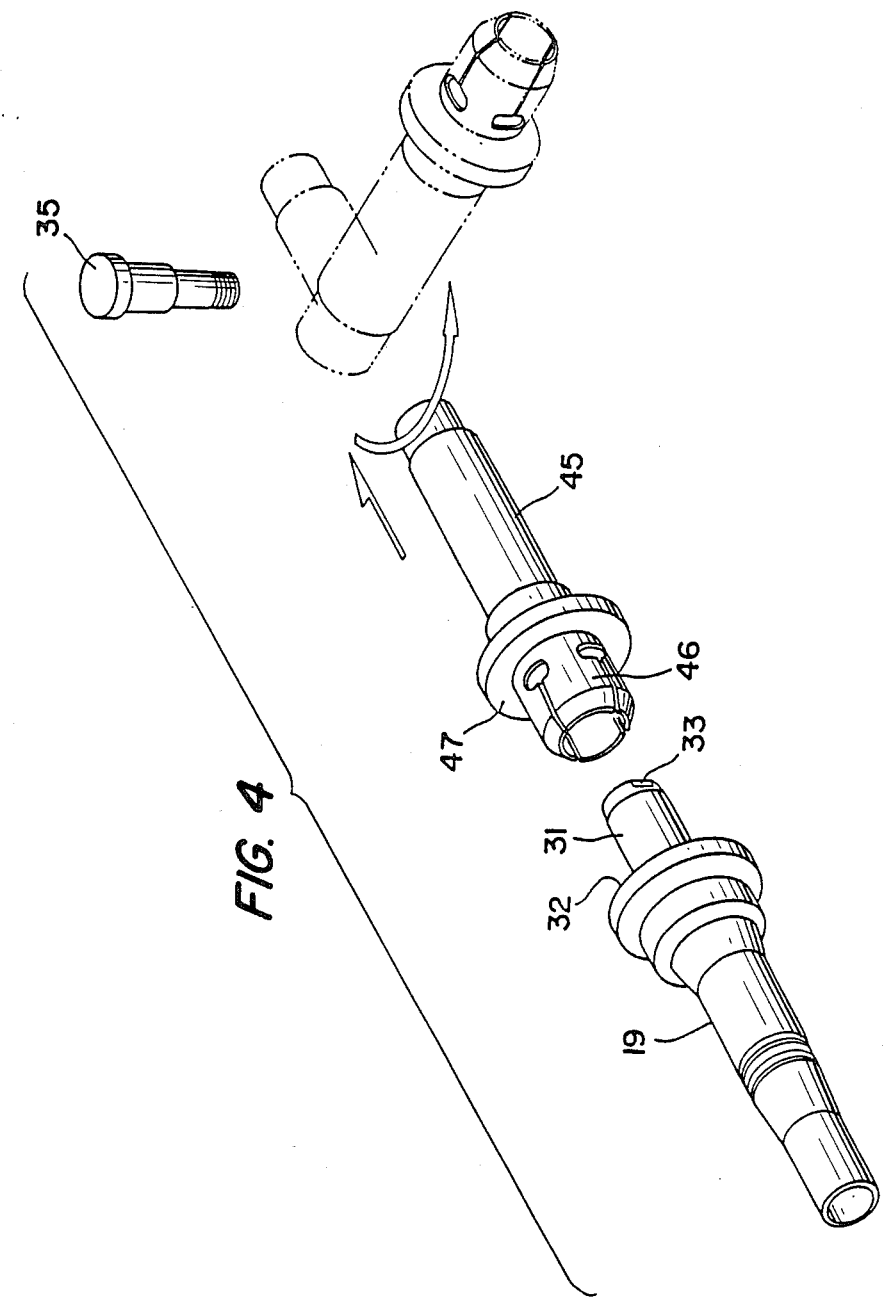
FIG. 4 is a perspective view of a cutter spindle and a support shaft in the same cutter head.

Within the cutter support 34 is rotatably supported the support shaft 45 via bearings 43 and 44, and this support shaft 45 is adapted to be positioned coaxially with the cutter spindle 19 at a rotational position of the cutter support 34 restrained by the positioning and fixing bolts 40. At the tip end portion of this support shaft 45, that is at the end portion opposed to the cutter spindle 19, is provided the hollow collet section 46 having an expansible and contractible diameter with slits formed therein as shown in FIG. 4. The inner circumference of the collet section 46 is adapted to have the above-described insert section 31 of the cutter spindle 19 fitted therein, and under the state where the insert section 31 has been fitted into the collet section 46, the outer diameter of the collet section 46 is somewhat expanded. The outer circumference of the collet section 46 is adapted to have the shaving cutter fitted therearound, and the dimensions are determined in such manner that under the state where the collet section 46 has been expanded in diameter as described above, the gap clearance at the fitting portion between the collet section 46 and the shaving cutter 17 may be extremely small (several microns). In addition, contiguously to and on the base end side of the collet section 46, on the support shaft 45 is formed a pressing surface 47 for pinching the shaving cutter 17 under pressure in cooperation with the pressing surface 32.

Furthermore, between the cutter spindle 19 and the support shaft 45 is provided a clamp device which clamps the shaving cutter 17 fitted around the outer circumference of the collet section 46 by bringing the cutter spindle 19 and the support shaft close to each other under the state where the insert section 31 of the cutter spindle 19 has been fitted in the collet section 46 of the support shaft 45. More particularly, a pull stud 48 is screwed into a center portion within the collet section 46 of the support shaft 45 to be fixed thereto, and on the other hand, on the side of the cutter spindle 19 is provided an openable and closable engaging jaw member 49 for gripping the pull stud 48 to pull it in. The engaging member 49 is mounted to a tip end of a pull rod 50 that is accommodated in the center portion of the cutter spindle 19 so as to be slidable in the axial direction. On the other hand, at the base end of the pull rod 50 is threadedly secured a cap 51, and belleville springs 52 for generating a clamping force are mounted between the cap 51 and the inner wall surface of the cutter spindle 19, so that the pull rod 50 is biased towards its base end side (leftwards as viewed in FIG. 1) by the resilient forces of the belleville springs 52. Furthermore, a cylinder 53 is formed adjacent to the base end portion of the pull rod 50, and a piston 54 of this cylinder 53 butts against the base end of the pull rod 50, so that in response to actuation of the cylinder 53, the piston 54 moves the pull rod 50 to the side of its tip end against the resilient forces of the belleville springs 52. The engaging member 49 moves in association with the movement of the pull rod 50 to the side of its tip end, resulting in opening of the tip end of the engaging member 49. On the other hand, if the actuation of the cylinder 53 is released, in association with the movement of the pull rod 50 to the side of its base end caused by the resilient forces of the belleville springs 52, the engaging member 49 retracts while being closed as restrained by the inner peripheral surface of the cutter spindle 19, and during that process it grips an expanded portion of the pull stud 48 and pulls it to the side of the base end. Under the above-mentioned state, the shaving cutter 17 fitted around the collet section 46 of the support shaft 45 is pinched under pressure between the pressing surface 32 of the cutter spindle 19 and the pressing surface 47 of the support shaft 45 via respective cutter collars 55 by the resilient forces of the belleville springs 52, and thereby it can be clamped. It is to be noted that the clamp device according to the present invention should not be limited to the illustrated structure, but besides, for example, the clamp force generating means such as belleville springs or the like could be provided on the side of the support shaft 45. In addition, in FIG. 1, reference numeral 56 designates a key for preventing relative rotation of the shaving cutter 17, reference numeral 57 designates a nut, and reference numeral 58 designates a plate to which the main shaft motor 18 is mounted, and which covers the cutter head main body 16.

Accordingly, in such a cutter head, when the shaving cutter is mounted or dismounted, at first the clamp is released by actuating the cylinder 53, and also the cutter support 34 is separated from the cutter spindle 19 by actuating the cylinder 41 for driving the slider 37. Then the shaving cutter 17 is separated from the cutter spindle 19 while it is kept fitted around the collet section 46 of the support shaft 45. When the insert section 31 of the cutter spindle 19 has been completely extracted from the collet section 46, next the nut 39 and the positioning and fixing bolts 40 are loosened, the cutter support 34 is rotated about the pivot bolt 35 so that the shaving cutter 17 may come to the front side, and thereafter mounting or dismounting of the shaving cutter 17 to or from the support shaft 45 is effected. Here, when the insert section 31 of the cutter spindle 19 has been extracted from the collet section 46, as the collet section 46 contracts in diameter, the gap clearance at the fitting portion between the collet section 46 and the shaving cutter 17 increases, also the support shaft 45 is directed towards the operator, and therefore, mounting or dismounting of the shaving cutter 17 can be carried out easily. It is to be noted that mounting of the shaving cutter 17 is carried out through an inverse procedure to that described above in connection with dismounting of the same.

Furthermore, it is to be noted that while one preferred embodiment of the present invention as applied favorably to a shaving machine has been described above, as a matter of course the present invention can be practiced in a cutter head in general machine tools other than the shaving machine.

As will be apparent from the above description of one preferred embodiment of the present invention, according to the present invention the following effects and advantages can be obtained:

(1) Upon replacement of a cutter, since it is unnecessary to remove a cutter support each time from a cutter head main body, a reduction of the amount of labor can be achieved.

(2) Since mounting or dismounting of a cutter can be effected under the state where the cutter is directed to the front side, an operator can carry out mounting or dismounting of a cutter at an easy attitude, and thus efficiency and workability is improved.

(3) When a cutter is fitted around or extracted from a support shaft, since the collet section contracts in diameter, the fitting or extraction operation can be achieved easily.

(4) As the procedure of a cutter replacement operation is simplified, automation of the cutter replacement operation become possible.

Since many apparently widely different embodiments of the present invention can be made without departing from the spirit of the present invention, all matter described in the specification and shown in the accompanying drawings shall be interpreted to be illustrative and not as a limitation to the scope of the invention.

What is claimed is:

1. A cutter head in a machine tool comprising a cutter head main body, a cutter spindle that is rotatably supported by said cutter head main body and adapted to be rotatably driven, a cutter support carried by said cutter head main body so as to be rotatable about an axis orthogonal to the cutter spindle axis and movable along the axial direction of said cutter spindle, a support shaft that is rotatably supported by said cutter support so as to be coaxial with said cutter spindle, a collet section having an expansible and contractible diameter so that the tip end of said cutter spindle can be fitted in the inner circumference of the collet section resulting in expansion of the diameter and a cutter can be fitted around the outer circumference of the collet section, said collet section being formed at the tip end of said support shaft, and clamp means for clamping the cutter fitted around the outer circumference of said collet section by bringing said cutter spindle and said support shaft close to each other under the state where the tip end of said cutter spindle is fitted in the collet section of said support shaft.

* * * * *